Sept. 6, 1938.  R. R. WEBBER  2,129,340
TRUCK
Filed June 17, 1936   5 Sheets-Sheet 1

Inventor
Ray R. Webber,
By
Attorneys

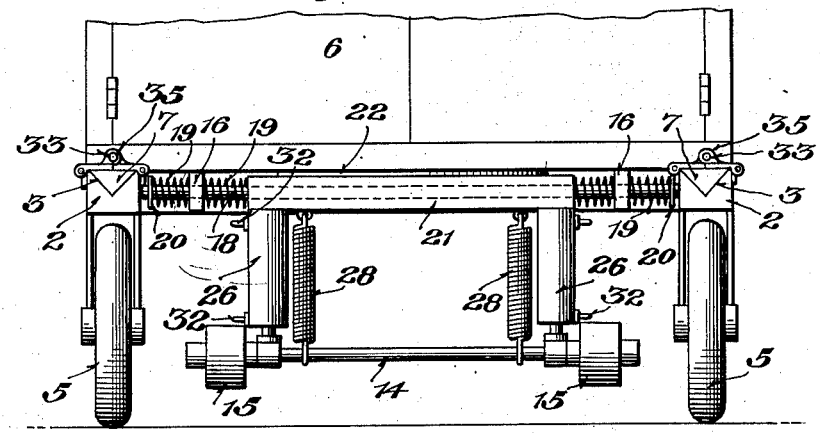
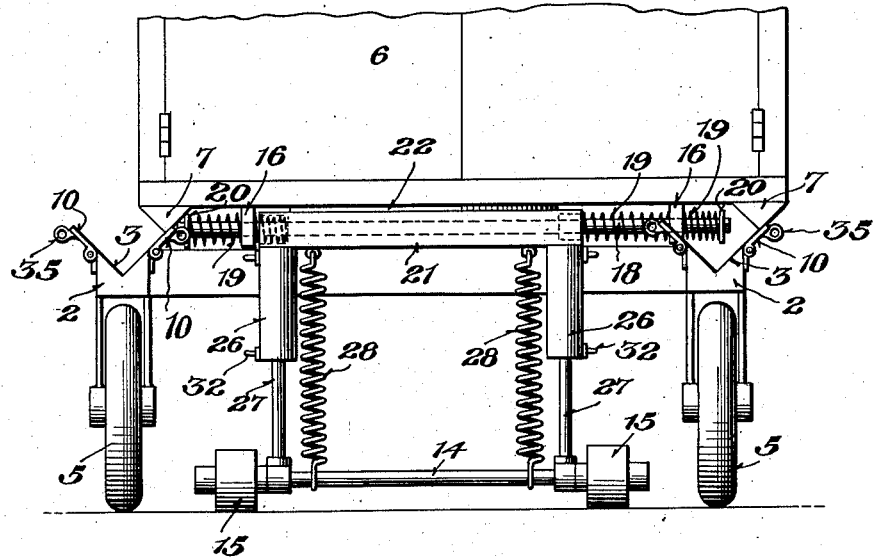

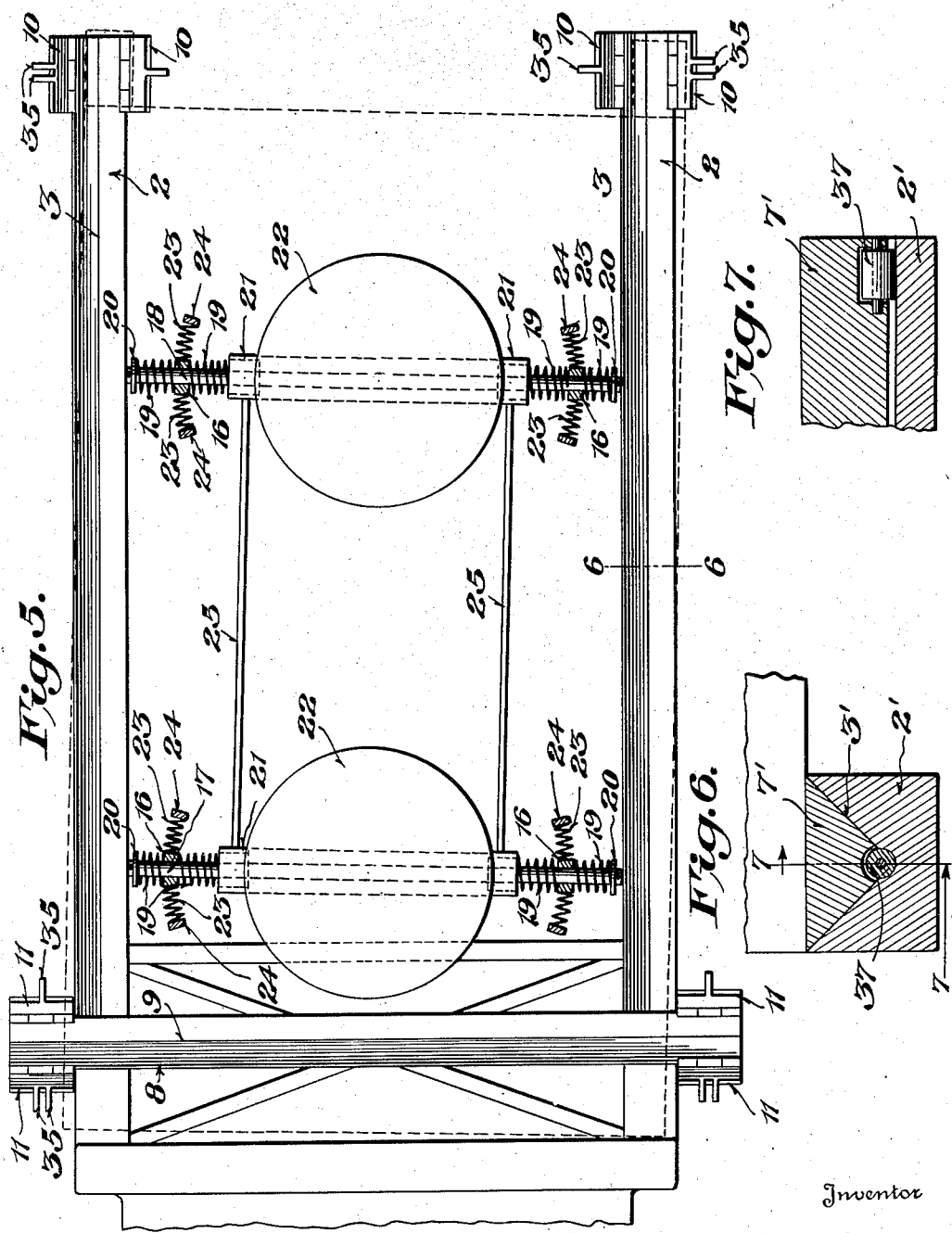

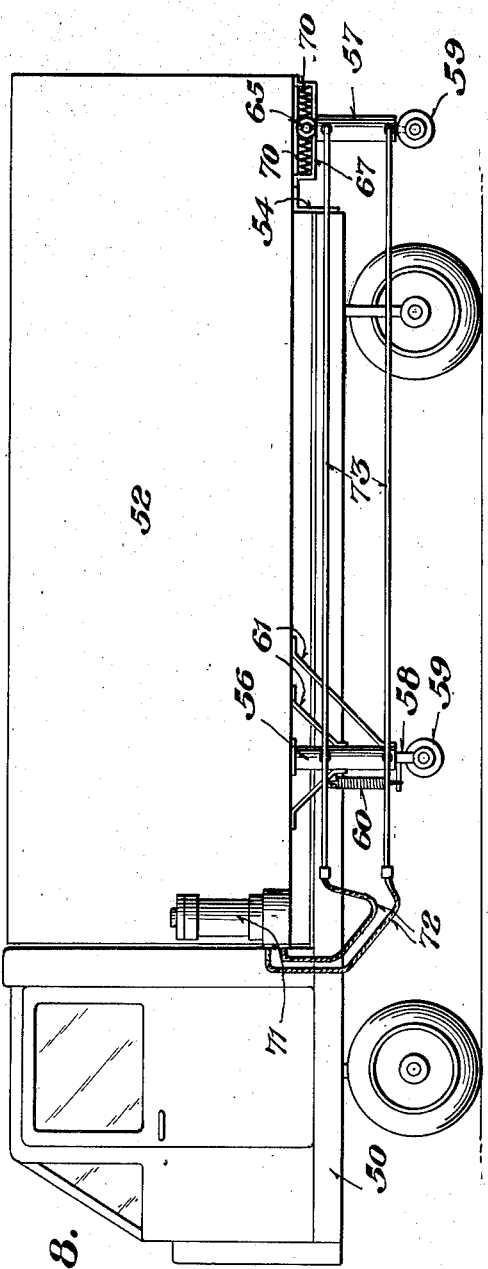

Sept. 6, 1938.  R. R. WEBBER  2,129,340
TRUCK
Filed June 17, 1936    5 Sheets-Sheet 5
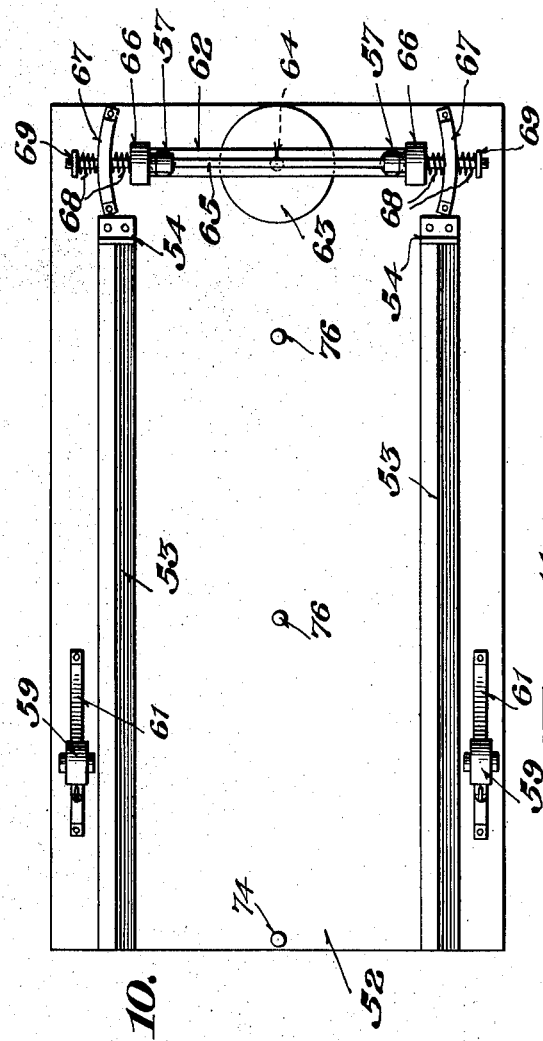
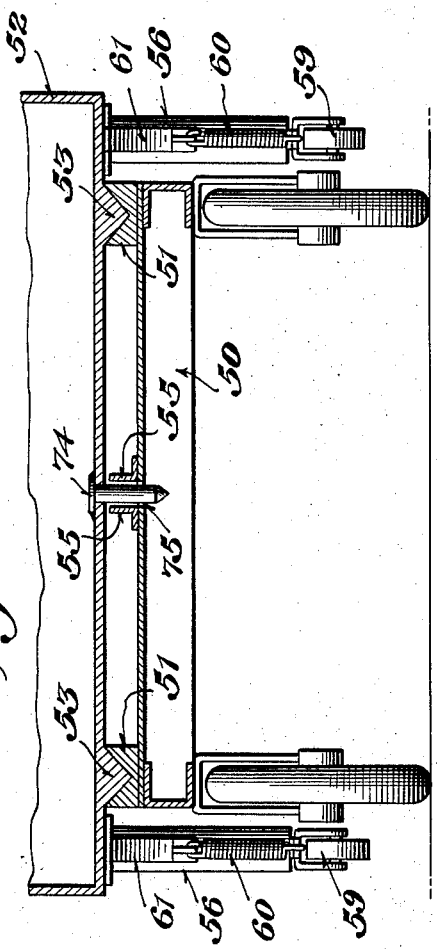
Inventor
Ray R. Webber
By
Attorneys Patented Sept. 6, 1938

2,129,340

UNITED STATES PATENT OFFICE 2,129,340

TRUCK

Ray R. Webber, Cleveland, Ohio

Application June 17, 1936, Serial No. 85,770

20 Claims. (Cl. 214—38)

This invention relates to trucks and more particularly to that type of truck shown in my Patent No. 1,973,030, September 11, 1934 and my copending applications Serial No. 670,011, May 8, 1933 now Patent 2,048,579 and Serial No. 740,681, August 20, 1934, now Patent 2,048,580.

The primary object of the invention is to provide a load carrier which is provided with a landing gear having hydraulically operated elevating means whereby to enable the carrier to be easily and quickly raised to the plane of the load carrying part of a truck.

A further object of the invention is to provide means whereby upon backing of the truck to points beneath the load carrier and upon lowering of the latter, the carrier will be automatically centered or brought into predetermined operative carrying relation to the truck.

A still further object of the invention is to provide means for locking and unlocking the carrier to the truck so that the carrier acts to prevent spreading of the sides of the truck.

A still further object of the invention is to provide a truck having means to adapt same to a plurality of independent load carrying units.

Still further the invention aims to provide a load carrier which may be easily transported by freight cars.

In the drawings:

Fig. 3 is an enlarged fragmentary rear elevation of Fig. 1, showing the landing gear in inoperative position;

Fig. 4 is a view similar to Fig. 3 showing the landing gear in operative position with the load carrier in raised position and in its initial stage of being lowered into transporting relation to the truck;

Fig. 5 is a section on line 5—5 of Fig. 1;

Fig. 6 is an enlarged section on line 6—6 of Fig. 5 showing a modified form of the invention;

Fig. 7 is a section on line 7—7 of Fig. 6;

Fig. 8 is a side elevation similar to Fig. 1, of a modified form of the invention;

Fig. 9 is a top plan view of Fig. 8 with the load carrier removed;

Fig. 10 is a bottom plan view of the load container; and

Fig. 11 is a section on line 11—11 of Fig. 9.

Figures 1, 2:
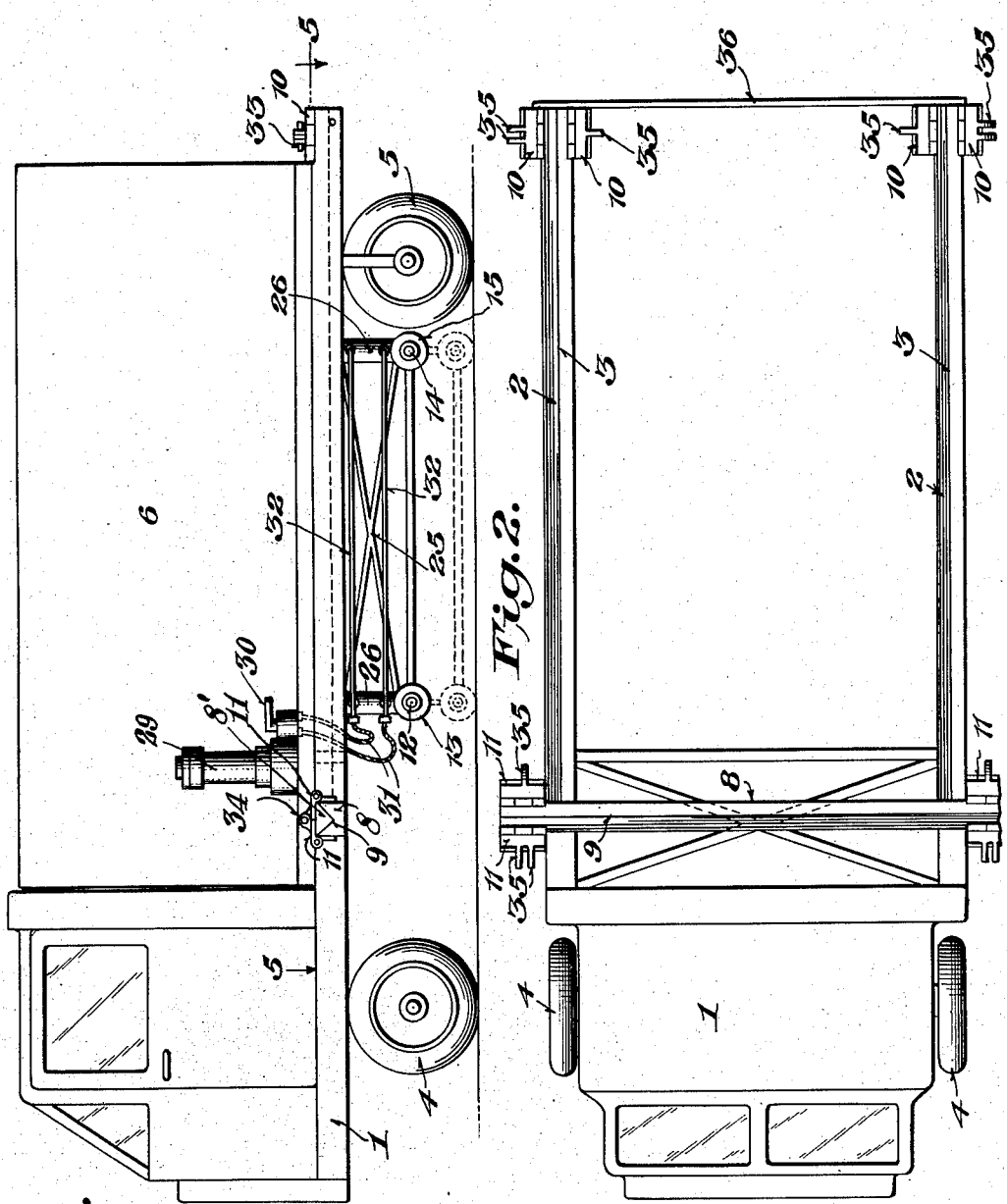
Fig. 1 is a side elevation of the invention showing the load container or unit secured in transporting relation to the truck.
Fig. 2 is a top plan view of the truck with the load container removed.

In proceeding in accordance with the present invention, a truck 1 is provided having rearwardly extending spaced side bars 2, which latter have channels 3 of V-shape in cross section formed in their upper faces. The truck is provided with the usual traction wheels 4 and 5.

A load container or unit 6 is provided which has depending side rails 7, which latter are of substantially V-shape in cross section to correspond to the channels 3.

Referring to Figs. 1, 2 and 5 it will be seen that the front ends of the side bars 2 are connected by a cross bar 8 which latter has its upper face formed with a channel 9, of V-shape in cross section. The rear ends of the side bars 2 are provided with a pair of complementary hinged locking plates 10 while the ends of the cross bar 8, which latter it will be noted project outwardly beyond the side bars 2, are provided with similar pivoted complementary locking plates 11.

The load container 6 is provided with a cross bar 8' of V-cross section receivable in the channel 9 of cross bar 8 of the truck. For the purpose of raising and lowering the load container a landing gear is provided having a forward shaft 12 equipped with rollers 13 and a rear shaft 14 equipped with corresponding rollers 15.

As shown in Figs. 3 and 4 two pairs of spaced brackets 16 depend from the bottom of the load container 6, and are perforated to receive a forward shaft 17 and a corresponding rear shaft 18 which extend transversely of the load container. The shafts 17 and 18 have free sliding movement through the brackets 16 and have opposed coil springs 19 mounted thereon, the outer ends of the outer springs abutting washers 20 affixed to the ends of the shafts while their inner ends abut the brackets 16. The outer ends of the inner springs 19 abut journals 21 (Fig. 5) in which the shafts 17 and 18 are mounted. Turntables 22 are secured to the journals 21 and have rotatable engagement with the bottom of the load container. The shafts 17 and 18 have oscillatory movement and are tensioned by springs 23 which abut the brackets 16 and brackets 24 that depend from the bottom of the load container. The journals 21 are connected together by tie rods 25 as shown in Fig. 5.

The turntables serve to support hydraulic cylinders 26, which depend therefrom and are provided with the usual pistons, the rods 27 of which afford journals for the shaft 14. For the purpose of raising the shaft 14 to a position where the wheels 15 thereof are out of contact with the road or other surface, coil springs 28 are provided which are connected to the shaft 14 and to the journals 21.

For the purpose of operating the hydraulic lifting devices for the landing gears, a source of air supply 29 is mounted on the unit 6 and has a hand valve 30 to admit air to hose 31, which latter connects onto pipes 32 that are connected to the hydraulic cylinders 26.

In operation, air is admitted to the hydraulic cylinders 26 so as to move the piston rods 27 and thereby the shaft 14 with its wheels 15 against the road or other surface thereby to elevate the load container to a position where its side rails 7 and the cross car 8' lie above the side bars 2 and cross bar 8 of the truck, following which the truck is backed to have its side bars 2 underlie the side rails 7 of the load container. Referring to Fig. 4 it will be seen that this alinement of the channels 3 of the truck side bars with the side rails 7 of the load container need not be perfect. At this point air is then gradually released from the cylinders 26 to permit the load container to be lowered, and during such lowering it will be seen that due to the shape of the channels 3 and side rails 7 the load will slide downwardly and transversely of the truck, which is shown at the inception of such movement in Fig. 4. This movement of the container progresses until the side bars 7 are fully and thereby conformably seated in the channels 3. It will be further noted that during the lowering of the load container, as shown in Fig. 4, the locking plates are formed so as to be held at angles corresponding to those of the V-channels 3, consequently such plates will guide the rails 7 into the channels 3. It will be understood in this regard that the hand cock 30 of the source of compressed air is very slowly manipulated, so that but little of the weight of the load is imposed on these plates.

After the rails 7 have been freely seated in the channels 3, then the locking plates 10 and 11 are moved to latched position as shown in Figs. 1 and 3, and pins 33 and 34 are applied through the perforated knuckles 35 of the locking plates. Thus the load carrier is locked or latched firmly to the truck chassis.

It is also to be noted that with the load container in locked relation to the truck, the side bars of the latter are effectively held against spreading by the container and that due to the seating of the transverse bar 8' of the container in the channel 9 of the cross bar 8 of the truck, longitudinal movement of the container relative to the truck is prevented.

For the purpose of preventing spreading of the side bars 2 of the truck during movement thereof without the load container, a bar 36 is provided which is removably attached to the rear ends of bars 2 in any suitable manner.

In order to remove strains or stresses on the landing gear during lateral movement of the side rails 7 into the channels 3, it will be seen from Fig. 4 that due to the spring mounting of the shafts 17 and 18 the latter can freely move transversely of the truck and will be returned to normal position when air is released from the cylinders 26 and the springs 28 restore the landing gears to normal position. It will further be apparent that due to the mounting of the shafts 17 and 18 for oscillatory movement any sidewise movement of the load carrier as depicted in dotted lines in Fig. 5 will be provided for.

Figs. 6 and 7 show a slight modification wherein the side bars 7' connected to the load container are provided with rollers 37 to facilitate positioning of the bars 7' in the channels 3'; the parts 2', 3' and 7' corresponding to the respective parts 2, 3 and 7 in the form of the invention disclosed in Figs. 1 to 5.

In the modified form shown in Figs. 8 to 11 the truck 50 is provided with side bars 51 having V-shaped channels formed in their upper faces, as in the preferred form. The load container 52 is formed on its bottom with V-shaped longitudinal rails 53 which are conformably received in the channels of the bars 51. As shown in Figs. 8 and 10 the ends of the rails 53 are provided with depending stops 54 so as to limit the rearward movement of the truck when the latter is backed into engagement with the elevated load container.

In this form of the invention a central track or guideway 55 is carried by the truck and has a flared mouth 56 for a purpose later to be set forth. The landing gear is comprised of a pair of hydraulic cylinders 56 mounted at the forward end of the load container and a corresponding pair of hydraulic cylinders 57 located at the rear of the load container. The pistons 58 of the hydraulic cylinders are provided with caster wheels 59. Springs 60 are connected to the pistons to return the latter to raised position following elevation of the load and exhaust of the compressed air from the cylinders, as in the preferred form of the invention.

The forward cylinders are suitably braced as indicated at 61. The rear cylinders 57 are connected by a cross bar 62 and upon the latter a turntable 63 is pivoted at 64 and engages the bottom of the load container 52. A shaft 65 is carried by brackets 66 which are secured to and depend from the bottom of the load container, the ends of the shaft being movable longitudinally of guides 67 also carried by the bottom of the load container.

Pairs of coil springs 68 are mounted on the shaft 65 and are disposed between the brackets 66, guides 67 and washers 69 affixed to the ends of the shaft. Further, as shown in Fig. 8, pairs of coil springs 70 are mounted in the guides 67 so that the shaft is tensioned in both longitudinal and transverse movements thereof. A suitable source of air supply 71 is connected by hose 72 and pipes 73 to all of the hydraulic cylinders.

In addition to pin 74 which is preferably spot welded in position, other guide pins 76 may be employed.

In operation of the modified form of the invention, the load carrier is initially elevated, so that its pins are disposed above the plane of the bottom of the truck in a position to engage the guides 55, but to not scrape against the bottom of the truck, and the latter is then alined with the carrier. The truck is then backed so that pin 74 will enter the mouth 56 of guide 55 and be guided thereby until the truck engages stops 54, at which time pin 74 will be alined with opening 75 in the truck. The carrier is then lowered whereupon pin 74 enters opening 75, thus latching the carrier to the truck and holding the carrier against movement both laterally and longitudinally of the truck. As in the preferred form the V-rails of the carrier will be laterally shifted by the V-walls of the channels of bars 51 should there not be accurate vertical alinement of the rails and bars.

It will be apparent that during this lateral shifting of the carrier, the turntable and spring devices at the rear of the carrier Fig. 8 will function as set forth in connection with Figs. 3 to 5 in the preferred form of the invention.

In both forms of the invention the source of compressed air supply 29 or 71 is preferably mounted on the load carrier and the cylinders may be charged with air in any suitable manner, such as for example, by a hand pump or at the usual gas filling stations, or if desired, same may be charged by an air compressor operated by the motor of the truck. However, the exact manner in which the cylinders are charged with air forms no part of the present invention. Referring to Fig. 5 it will also be apparent that the locking devices or plates 11 may be mounted on the side bars 2 instead of on the ends of the cross bar 8.

What is claimed is:

1. In a hauling device, a truck having side bars of V-shape in cross section and a load carrier having side rails also of V-shape in cross section receivable in the V-bars of the truck, means for elevating the carrier, so that its side rails can be disposed above the plane of the side bars of the truck whereby upon lowering of the carrier its side rails will be guided and moved by the side bars transversely of the truck so as to automatically position the carrier rails with respect to the truck bars, should the rails and bars not be vertically alined upon lowering of the carrier, complementary hinged locking plates for engagement with the carrier rails to lock the bars and rails together, which plates when in inoperative position are held in the plane of the sides of the V-bars so as to act as guides for the carrier rails upon movement of the carrier transversely of the truck.

2. In a hauling device, a truck and a load carrier, each having side members having portions of V-shape in cross section as to be receivable within each other, means for elevating the carrier so that its side rails can be disposed above the plane of the side bars of the truck whereby upon lowering its side rails will be guided and moved by the side bars transversely of the truck so as to automatically position the carrier rails with respect to the truck bars should the rails and bars be vertically disalined upon lowering of the carrier, and spring means for mounting the elevating device on the carrier so that the latter may move transversely of the truck while the elevating means remains stationary, and for restoring the elevating means to normal position upon raising of the latter.

3. A hauling device in accordance with claim 2, wherein there are transverse members carried by the truck and carrier disposed adjacent their fronts having complementary parts of V-shape in cross section receivable within one another so as to hold the carrier against movement longitudinally of the truck.

4. A hauling device in accordance with claim 2, wherein the truck and carrier have complementary means which inter-engage upon lowering of the carrier to hold the carrier against movement longitudinally of the truck.

5. A hauling device in accordance with claim 2, wherein there are means for mounting the elevating means on the load carrier so as to permit the latter to move transversely of the truck while the elevating means remains stationary.

6. A hauling device in accordance with claim 2, wherein the bottom of the truck is provided with a longitudinal guide, and wherein the load carrier has a member receivable in the guide with means for locking the member when the truck and carrier are in operative relation to prevent longitudinal movement of the carrier relative to the truck.

7. A hauling device in accordance with claim 2, wherein the bottom of the truck has a longitudinal guide provided adjacent to the front thereof with an opening and wherein the load carrier has a member secured thereto and movable lengthwise of the guide and receivable in the opening when the truck and carrier are operatively related.

8. A hauling device in accordance with claim 2, wherein there are transverse inter-engaging members carried by the truck and carrier adjacent their fronts, and means to latch the ends of said members together.

9. A hauling device in accordance with claim 2, wherein there are means to latch the carrier against movement longitudinally of the truck.

10. A hauling device in accordance with claim 2, wherein there are means to hold the bars and rails both against relative longitudinal and lateral movement.

11. In a hauling device, a truck having traction means and a longitudinal member of V-shape in cross section, a load carrier having a correspondingly shaped member receivable in the first named member, means for elevating the carrier so that its said member can be disposed above the plane of the truck member whereby upon lowering of the carrier its member will be guided and moved by the truck member so as to automatically position the carrier with respect to the truck should the members not be vertically alined upon lowering of the carrier, and spring means for mounting the elevating means on the carrier so that the latter may move transversely of the truck while the elevating means remains stationary and for restoring the elevating means to normal position upon raising of the latter.

12. A hauling device in accordance with claim 11, wherein the elevating means is located between the sides of the carrier and depend therefrom.

13. A hauling device in accordance with claim 11, wherein the elevating means is of unitary form and is located between the traction means of the truck and depend from the bottom of the carrier.

14. A hauling device in accordance with claim 11, wherein the elevating means consists of separate devices depending from the bottom of the carrier and located beyond the outer sides of the traction means of the truck.

15. In a hauling device, a truck having traction means and having side bars of substantially V-shape in cross-section and a load carrier having side rails of corresponding cross section receivable in the bars of the truck, means for elevating the carrier so that its side rails can be disposed above the plane of the side bars of the truck whereby upon lowering of the carrier its side rails will be guided and moved by the side bars transversely of the truck so as to automatically position the carrier rails with respect to the truck bars, should the rails and bars not be vertically alined upon lowering of the carrier, and complementary locking means associated with the side bars of the truck for engagement with the carrier rails and which when in unlocked position are held in the plane of the sides of the V-bars so as to act as guides for the carrier rails upon movement of the carrier transversely of the truck.

16. In a hauling device, a truck having traction means and having centering means, a load carrier having centering means cooperable with the centering means of the truck, means for elevating the carrier so that its said centering means can be disposed above the plane of the truck member whereby upon lowering of the carrier its centering means will be guided and moved by the centering means of the truck so as to automatically position the carrier with respect to the truck should the centering means not be vertically alined upon lowering of the carrier, and tensioned means for mounting the elevating means on the carrier so that the latter may move transversely of the truck while the elevating means remain stationary and for restoring the elevating means to normal position upon raising of the latter.

17. A hauling device in accordance with claim 16, wherein the elevating means has pivotal movement.

18. A hauling device in accordance with claim 16, wherein the elevating means embodies hydraulic pistons and cylinders, and spring means for restoring the elevating means above the surface on which the traction means of the truck engage upon release of the hydraulic means.

19. A hauling device in accordance with claim 16 wherein the elevating means embodies a shaft which is mounted for pivotal movement and wherein the means for restoring the elevating means to normal position embody springs engaging the end portions of the shaft.

20. A hauling device in accordance with claim 16 wherein the elevating means embodies a pair of connected shafts mounted for pivotal movement and wherein the means for restoring the shafts to normal position consists of springs engaging the end portions of the shafts.

RAY R. WEBBER.